United States Patent [19]
Tsai

[11] Patent Number: 5,137,432
[45] Date of Patent: Aug. 11, 1992

[54] NOISE-PREVENTATIVE AQUARIUM PUMP

[76] Inventor: Hsien-Tang Tsai, P.O. Box 55-1670, Taipei (10477), Taiwan

[21] Appl. No.: 705,737

[22] Filed: May 28, 1991

[51] Int. Cl.⁵ .................. F04B 43/00; F01N 7/02
[52] U.S. Cl. ........................... 417/312; 417/413; 181/232; 181/240
[58] Field of Search ............ 417/312, 313, 413; 181/232, 230, 403, 240

[56] References Cited

U.S. PATENT DOCUMENTS

| | | | |
|---|---|---|---|
| 2,228,565 | 1/1941 | Haddaway | 417/413 |
| 3,539,276 | 11/1970 | Matsuura | 417/413 |
| 3,671,151 | 6/1972 | Duke | 417/413 |
| 3,825,374 | 7/1977 | Kondo | 47/413 |
| 3,830,596 | 8/1979 | Kondo | 417/413 |

Primary Examiner—John J. Vrablik
Assistant Examiner—Peter Koryinyh

[57] ABSTRACT

An aquarium pump includes an air-delivery silencer connected with an air-pumping device encased in two covers mounted on a base portion having a silencing box provided with a plurality of sinuous air passages in the box for reducing a sound transmission speed and pressure of sound wave caused by the operating pump for greatly reducing its noise, and a metal plate embedded in a bottom plate formed in the base portion having a plurality of spring-like cushioning supporting legs secured under the bottom plate for further reducing vibrations caused by the operating pump for preventing noise pollution from an aquarium pump.

4 Claims, 7 Drawing Sheets

FIG.1

PRIOR ART

FIG.2 PRIOR ART

PRIOR ART

FIG.3

PRIOR ART

NOISE-PREVENTATIVE AQUARIUM PUMP

BACKGROUND OF THE INVENTION

A conventional aquarium pump as shown in FIGS. 1-4 comprises: a base portion 1 supporting on a table surface by a plurality of legs 3 having an outer extension 11 circumferentially formed on a bottom plate portion 10 of the base portion 1, and an inner extension 12 formed on the bottom plate portion 10 within the outer extension 11; an air-pumping means 4 connected with an air delivery box 5 shielded by an inner cover 6 mounted on the inner extension 12 as packed by a packing member 13; and an outer cover 7 provided with an adjusting knob 14 and an air inlet port 15 mounted on the outer extension 11 of the base portion 1. The air-pumping means 4 includes a pair of pumping diaphragms 41 reciprocatively compressed and released by a pair of actuating levers 42 resiliently secured to the box 5 each lever 42 having a magnet 421 secured on the lever 42 to be intermittently attracted by an electromagnet 43 electrically connected with a power source for pumping air outwardly through two discharge tubes 55 protruding outwardly beyond the two covers 6, 7 for delivering air into an aquarium.

However such a conventional aquarium pump still has the following drawbacks:

1. During the air-pumping operation by the pump, serious vibration of the air-pumping means 4 may exert noise by transmitting noise sound waves downwardly through the bottom plate 10 made of plastic material.

2. The use of legs 3 shaped as solid cylindrical stems of elastomeric material is not satisfactory for reducing noise.

3. Pumping air through two straight passages 5a formed in the base 5 (FIG. 4) and discharging outwardly directly does not slow down the transmission of the sound wave in box passages, thereby the aquarium pump is inefficient in preventing noise pollution.

It is therefore expected to disclose a silencer for improving a noise reduction for an aquarium pump.

SUMMARY OF THE INVENTION

The object of the present invention is to provide an aquarium pump including an air-delivery silencer connected with an air-pumping device encased in two covers mounted on a base portion having a silencing box provided with a plurality of sinuous air passages in the box for reducing a sound transmission speed and pressure of sound waves caused by the operating pump for greatly reducing its noise, and a metal plate embedded in a bottom plate formed in the base portion having a plurality of spring-like cushioning supporting legs secured under the bottom plate for further reducing vibrations caused by the operating pump for preventing noise pollution from an aquarium pump.

DETAILED DESCRIPTION

As shown in FIGS. 5-9, the present invention comprises: a base portion 1 having a metal shielding plate 2 embedded in the base portion 1 and a plurality of cushioning supporting legs 3 secured under the base portion 1 for placing a pump of the present invention on a table surface or other surfaces, an air-pumping means 4, an air-delivery silencer 5 connected with the air-pumping means 4 shielded by an inner cover 6 mounted on the base portion 1, and an outer cover 7 mounted on the base portion 1 for doubly shielding the air-pumping means 4.

Figure 1:
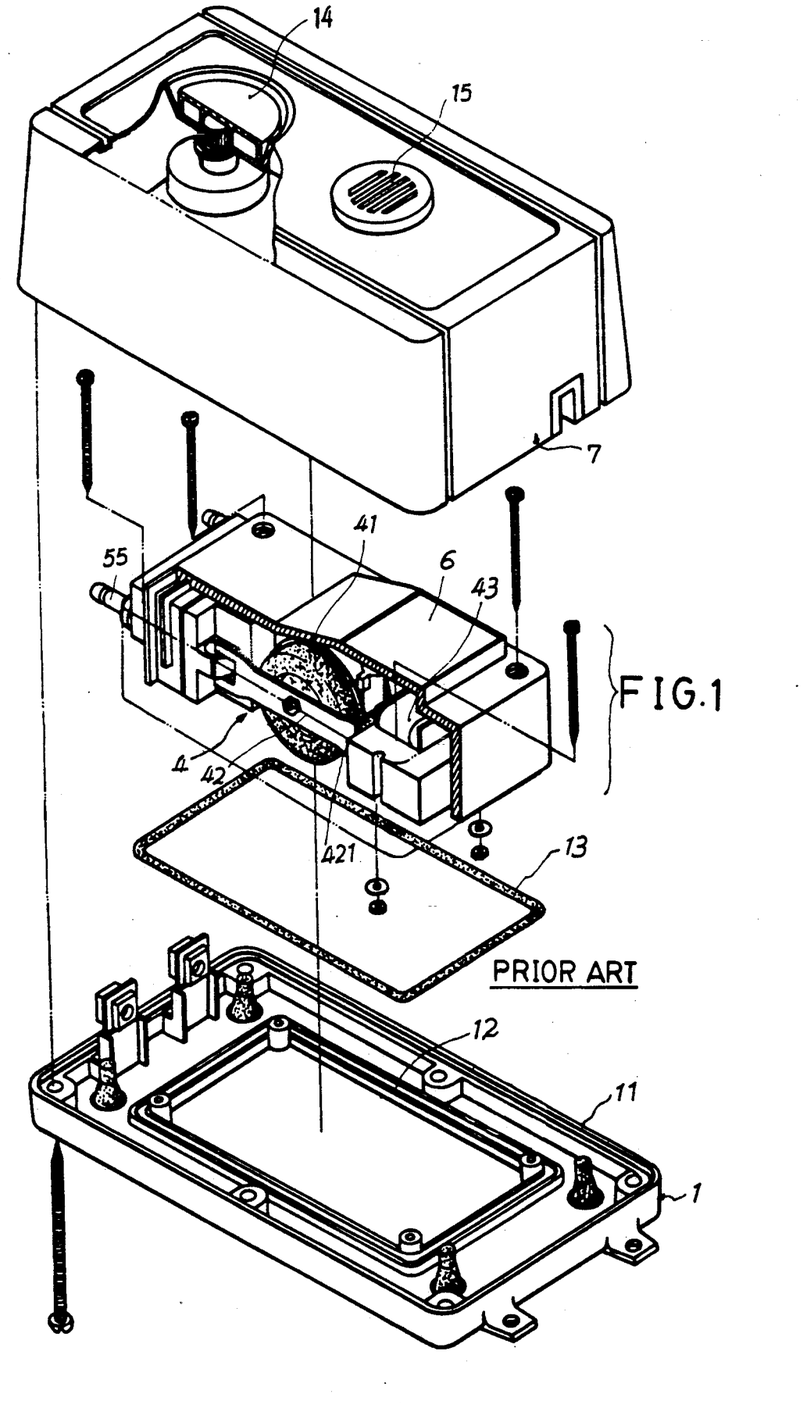
FIG. 1 is an exploded view showing all elements in construction of a conventional aquarium pump.
Figure 2:
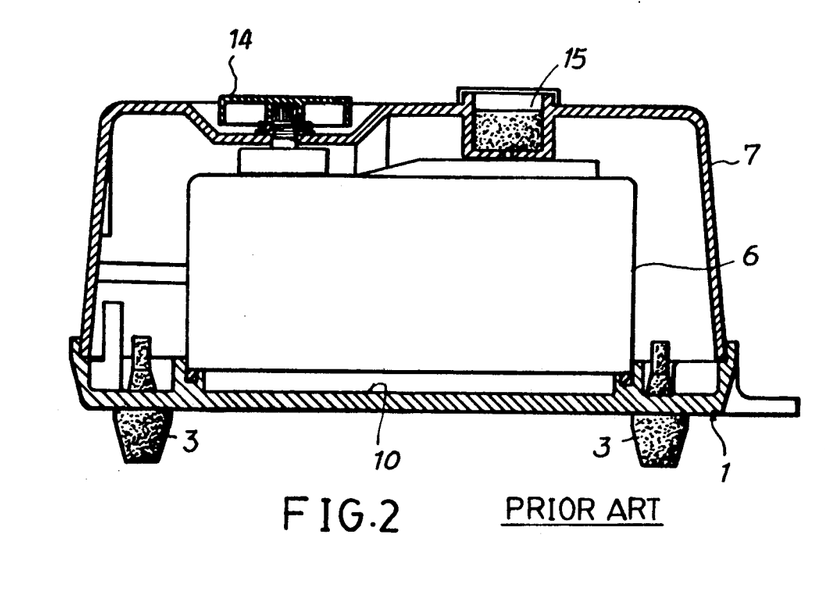
FIG. 2 is a partial sectional drawing of the conventional pump.
Figure 3:
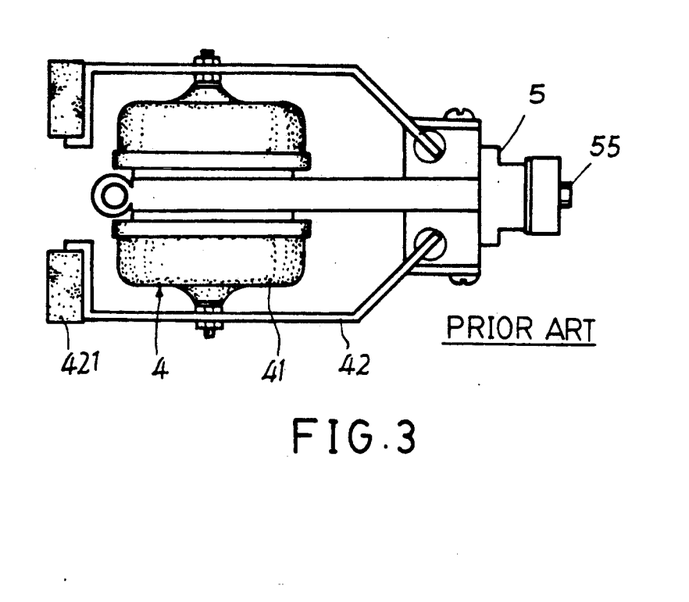
FIG. 3 shows an air-pumping means of the conventional pump.
Figure 4:
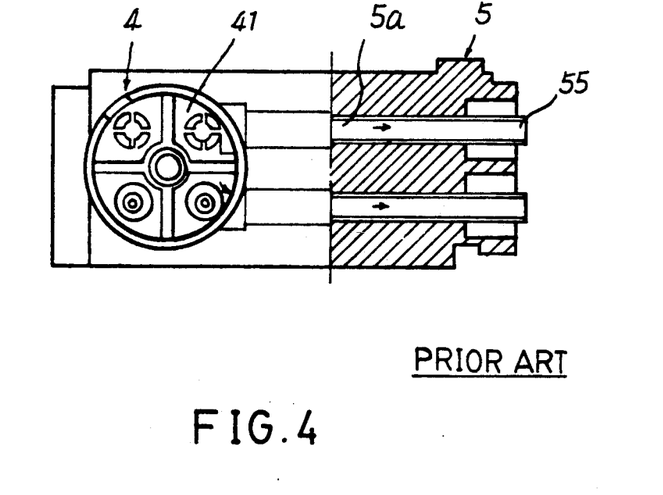
FIG. 4 is a sectional drawing of the pumping means of the conventional pump.
Figure 5:
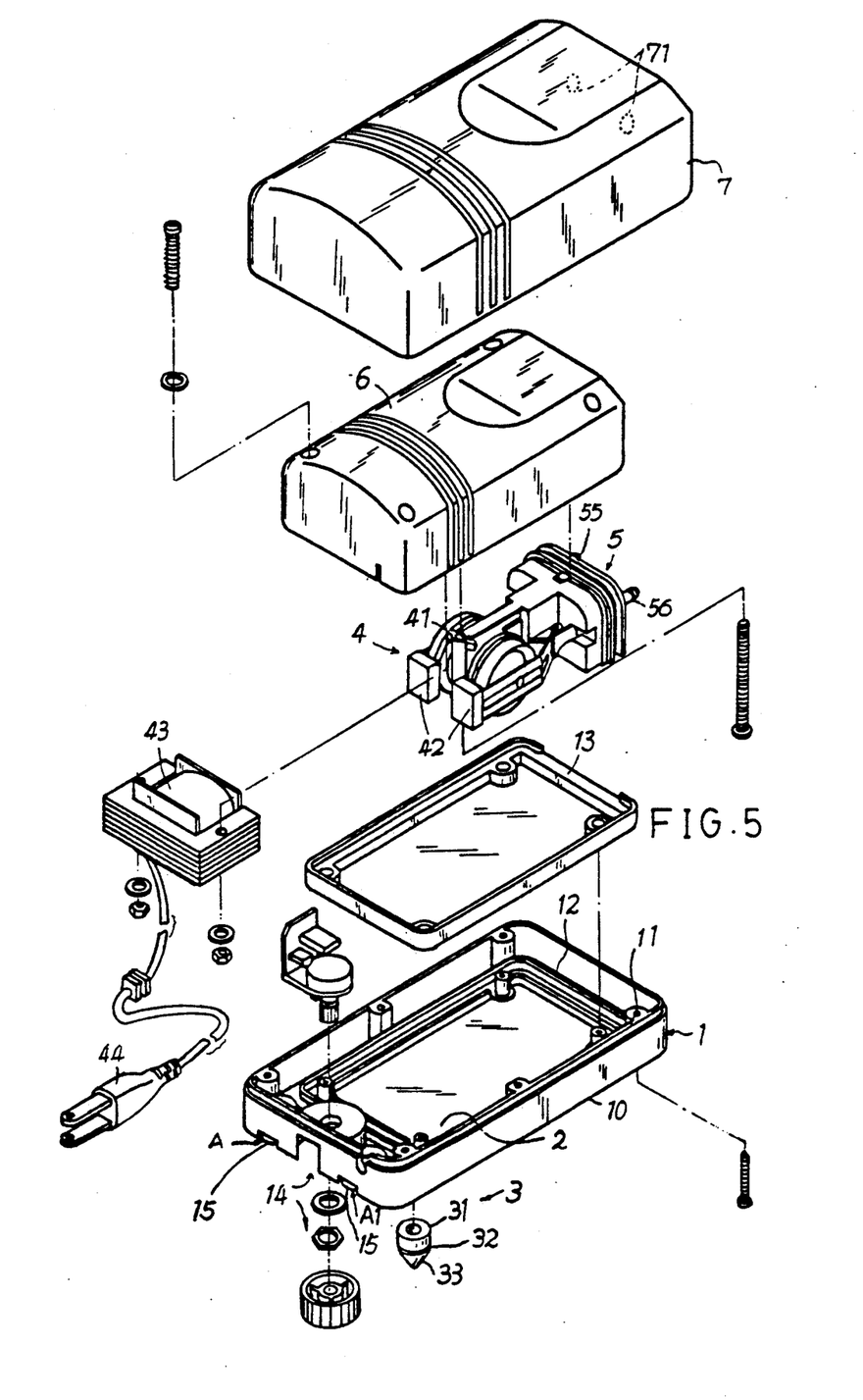
FIG. 5 is an exploded view showing all elements of the present invention.
Figure 6:
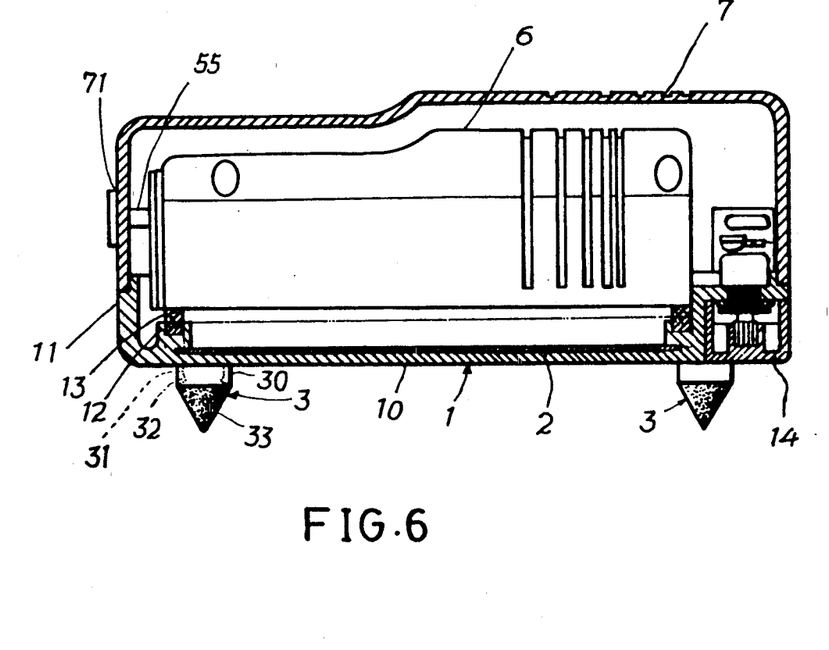
FIG. 6 is a sectional drawing of the present invention.
Figure 7:
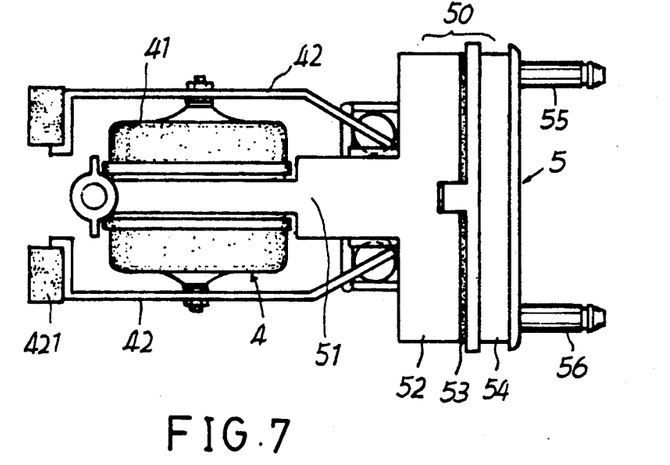
FIG. 7 shows a pumping means and a silencer of the present invention.
Figure 8:
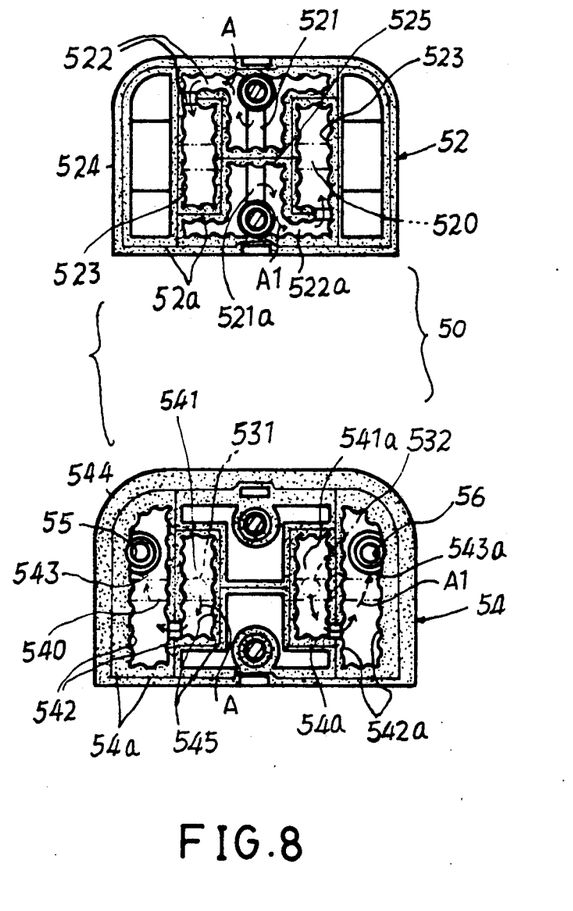
FIG. 8 is a plan view showing two box portions of the silencer of the present invention.
Figure 9:
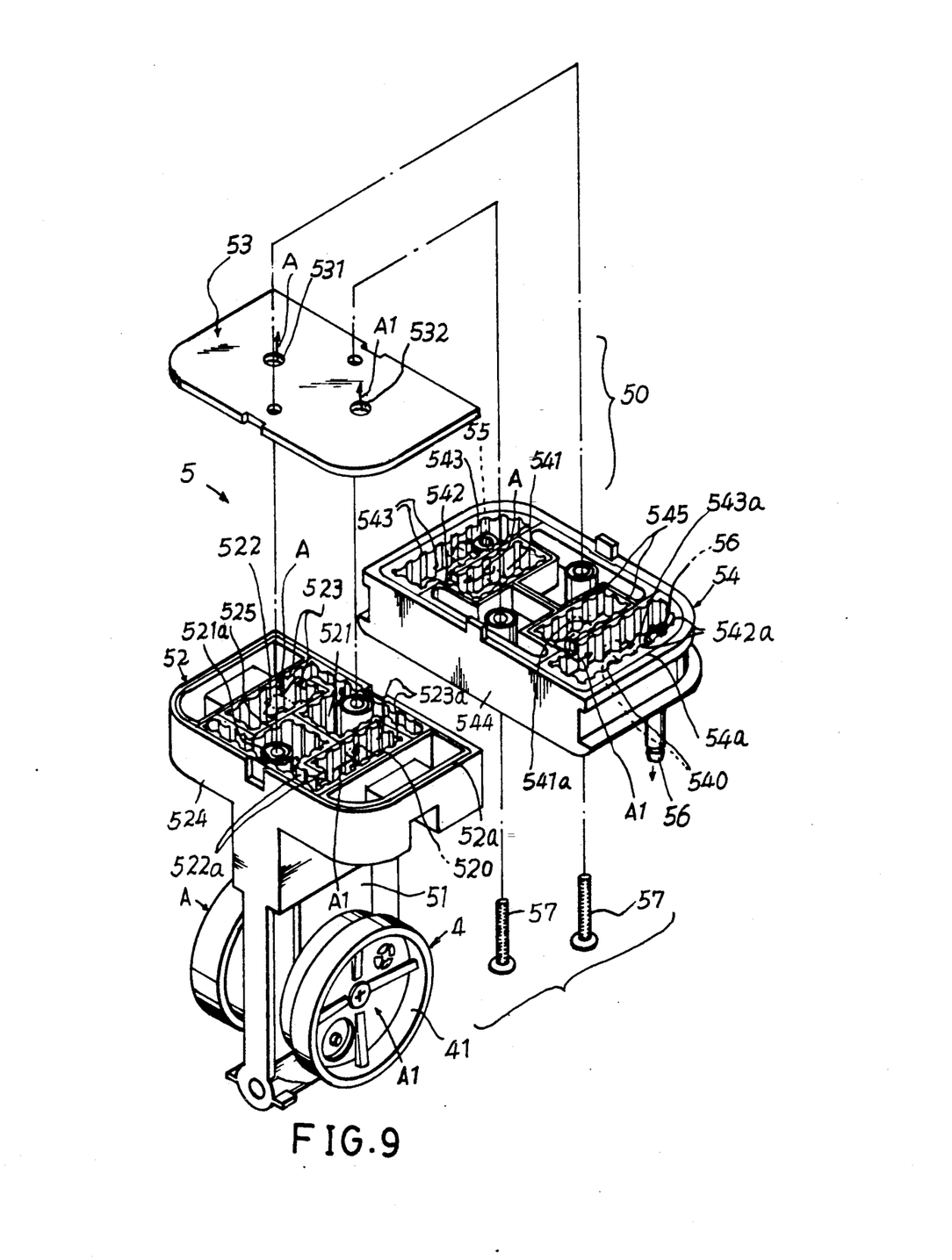
FIG. 9 is a perspective view showing the exploded silencer in accordance with the present invention.

The base portion 1 includes: a bottom plate portion 10, an outer extension 11 circumferentially formed on an outer side edge of the bottom plate portion 10, an inner extension 12 formed on the bottom plate portion 10 within the outer extension 11 engageable with a hollow packing member 13 on the inner extension 12, an adjusting knob 14 rotatably formed on a lower portion of the base portion 1 for adjusting air-pumping flow rate, and two air inlet ports 15 formed in the bottom plate portion 10 for entering air therethrough as shown in directions A, A1, in FIG. 1.

The metal shielding plate 2 is selected from metal plates such as iron, stainless steel, copper plate, etc. for shielding sound wave transmitted downwardly through the bottom plate portion 1.

Each cushioning supporting leg 3 made of elastomer or rubber materials includes: an upper hollow cylinder 31 inserted in a leg holder 30 secured under the bottom plate portion 10, an annular groove 32 annularly recessed in the leg 3, and a conical foot portion 33 tapered downwardly to stand on a surface. The annular groove 32 will help the leg 3 exert an elastic property like a spring for a buffer for reducing vibrational noise caused by an operating aquarium pump. The conical foot portion 33 is tapered to almost become a tip point to reduce its contacting area and counter force acted by the pump with the surface on which the pump stands, thereby reducing the vibrational noise caused by the pump.

The air-pumping means 4 includes: two pumping diaphragms 41 disposed on two opposite sides of the silencer 5, two actuating levers 42 resiliently secured to the silencer 5, each lever 42 having a magnet 421 fixed on its front end portion to be intermittently attracted by an electromagnet 43 electrically connected to an alternative-current power source 44, for reciprocatively compressing or releasing the diaphragms for pumping air from the ports 15 of the base portion 1 to be delivered outwardly through the silencer 5. The air-pumping means 4 is a conventional device and is not claimed in this invention.

The air-pumping means 4 and the silencer 5 are encased in the inner cover 6 mounted on the inner extension 12 by the hollow packing member 13, and doubly shielded by the outer cover 7 mounted on the outer extension 11. Two air-discharge tubes 55, 56 are formed on the silencer 5, protruding outwardly through the inner cover 6, and two holes 71 formed in the outer cover 7 for connecting two hoses (not shown) for delivering air into an aquarium (water) for feeding fishes.

The essential element of this invention is the air-delivery silencer 5 which includes: a main duct 51 mounted with and fluidically communicated with the air-pumping means 4, a silencing box 50 formed by combining a primary silencing box portion 52 enlarged from the main duct 51 and a secondary silencing box portion 54 secured with the primary silencing box portion 52 by means of a packing plate 53 partitioned between the two box portions 52, 54 and secured by bolts 57, a first air-discharge tube 55 and a second air-discharge tube 56 connected with the secondary silencing box portion 54 for delivering pumped air outwardly; both the silencing box portions 52, 54 formed with a plurality of sinuous air passages therein each sinuous air passage defined by two opposite corrugated side walls for reducing transmission speed and pressure of a sound wave exerting from an operating air-pumping means 4 when powered for reducing noise pollution therefrom.

The primary silencing box portion 52 includes: a pair of inlet openings 521, 521a separated by a first central partition plate 525 generally H shaped and formed through a central bottom portion of a first casing 524 of the primary silencing box portion 52 respectively fluidically communicated with a main air passage formed in the main duct 51 for directing pumped air into the primary box portion 52; and a pair of first sinuous air passages 522, 522a respectively communicated with the two inlet openings 521, 521a and sinuously extended towards two opposite side portions within the primary box portion 52; each first sinuous air passage 522 or 522a being defined by two opposite corrugated side walls 523, 523a; the two first sinuous air passages 522, 522a respectively communicated with two holes 531, 532 formed in the packing plate 53 sandwiched between the primary and the secondary box portions 52, 54.

The secondary silencing box portion 54 includes: a pair of second sinuous air passages 541, 541a separated with a second central partition plate 545 generally H shaped formed in a second casing 544 of the secondary box portion 54 and respectively communicated with the two first sinuous air passages 522, 522a of the primary box portion 52 through the two holes 531, 532 formed in the packing plate 53, the two second sinuous air passages 541, 541a sinuously extended towards two opposite side portions within the secondary box portion 54; each second sinuous air passage 541, 541a being defined by two opposite corrugated side walls 542, 542a; and two outlet openings 543, 543a respectively communicated with the two second sinuous air passages 541, 541a and connected with the two air-discharge tubes 55, 56 secured to the second casing 544 of the secondary box portion 54 and protruding outwardly.

Either the primary or the secondary box portion 52 or 54 is formed with a reinforced rib 520 or 540 in each casing 524 or 544 for reinforcing each H-shaped partition plate 525 or 545; and formed with an extension rim 52a or 54a circumferentially on an outer surface of each casing 524 or 544 to be well sealed by the packing plate 53 made of elastomer or rubber.

For operating the air-pumping means 4 of the present invention, the air flowing in direction A, A1 is pumped by the two diaphragms 41 to boost air through the main duct 51 to be delivered through the two inlet openings 521, 521a; two first sinuous passages 522, 522a; two holes 531, 532 in the packing plate 53; two second sinuous passages 541, 541a, two outlet openings 543, 543a to be finally discharged by the two tubes 55, 56. Each air stream A or A1 is expanded from duct 51 to the enlarged silencing box 50 and is frictionally decreased its flowing speed and pressure by the plural sinuous passages and corrugated side walls, thereby greatly reducing its sound wave speed and pressure for reducing its noise pollution very effectively. The air flowing directions A, A1 are clearly shown in FIGS. 8, 9.

I claim:

1. In an aquarium pump having:

a base portion having a bottom plate portion formed on a bottom of the base portion and a plurality of cushioning supporting legs secured under said bottom plate portion;

an air-pumping means secured with an air-delivery silencer encased in an inner cover mounted on an inner extension formed on said bottom plate portion;

an outer cover mounted on an outer extension circumferentially formed on a side edge portion of said bottom plate portion for shielding the inner cover already encasing the air-pumping means and said silencer in the inner cover;

the improvement which comprises:

said air-delivery silencer including:

a main duct mounted with and fluidically communicated with the air-pumping means, a silencing box formed by combining a primary silencing box portion enlarged from the main duct and a secondary silencing box portion combinably secured with the primary silencing box portion by a packing plate partitioned between the two box portions, two air-discharge tubes connected with the secondary silencing box portion for delivering pumped air outwardly; said two silencing box portions respectively formed with a plurality of sinuous air passages therein each said sinuous air passage defined by two opposite corrugated side walls within a casing of each said box portion for reducing transmission speed and pressure of sound waves exerting from an operating air-pumping means for reducing noise pollution.

2. An aquarium pump according to claim 1, wherein said primary silencing box portion includes: a pair of inlet openings separated by a central partition plate generally H shaped and formed through a central bottom portion of a first casing of the primary silencing box portion respectively fluidically communicated with a main air passage formed in the main duct for directing pumped air into the primary box portion; and a pair of first sinuous air passages respectively communicated with the two inlet openings and sinuously extended towards two opposite side portions within the first casing of the primary box portion; each said sinuous air passage defined by two opposite corrugated side walls formed in the first casing; the two first sinuous air passages respectively communicated with two holes formed in the packing plate sandwiched between the primary and the secondary box portions.

3. An aquarium pump according to claim 1, wherein said secondary silencing box portion includes: a pair of second sinuous air passages separated by a second central partition plate generally H shaped formed in a second casing of the secondary box portion and respectively communicated with the two first sinuous air passages of the primary box portion through the two holes formed in the packing plate, the two second sinuous air passages sinuously extended towards two opposite side portions within the second casing of the secondary box portion; each of the second sinuous air passage defined by two opposite corrugated side walls formed in said second casing; and two outlet openings respectively communicated with the two second sinuous air passages and connected with two air-discharge tubes secured to the second casing of the secondary box portion and protruding outwardly.

4. An aquarium pump according to claim 1, wherein each of the said silencing box portions is formed with a reinforced rib in each said casing for reinforcing each H-shaped central partition plate formed in each said casing; and formed with an extension rim circumferentially on an outer surface of each the casing to be well sealed by the packing plate.

* * * * *